Jan. 31, 1950 G. VALENSI 2,495,790
SCANNING SYSTEM FOR TELEVISION RECEIVERS
Filed March 1, 1941
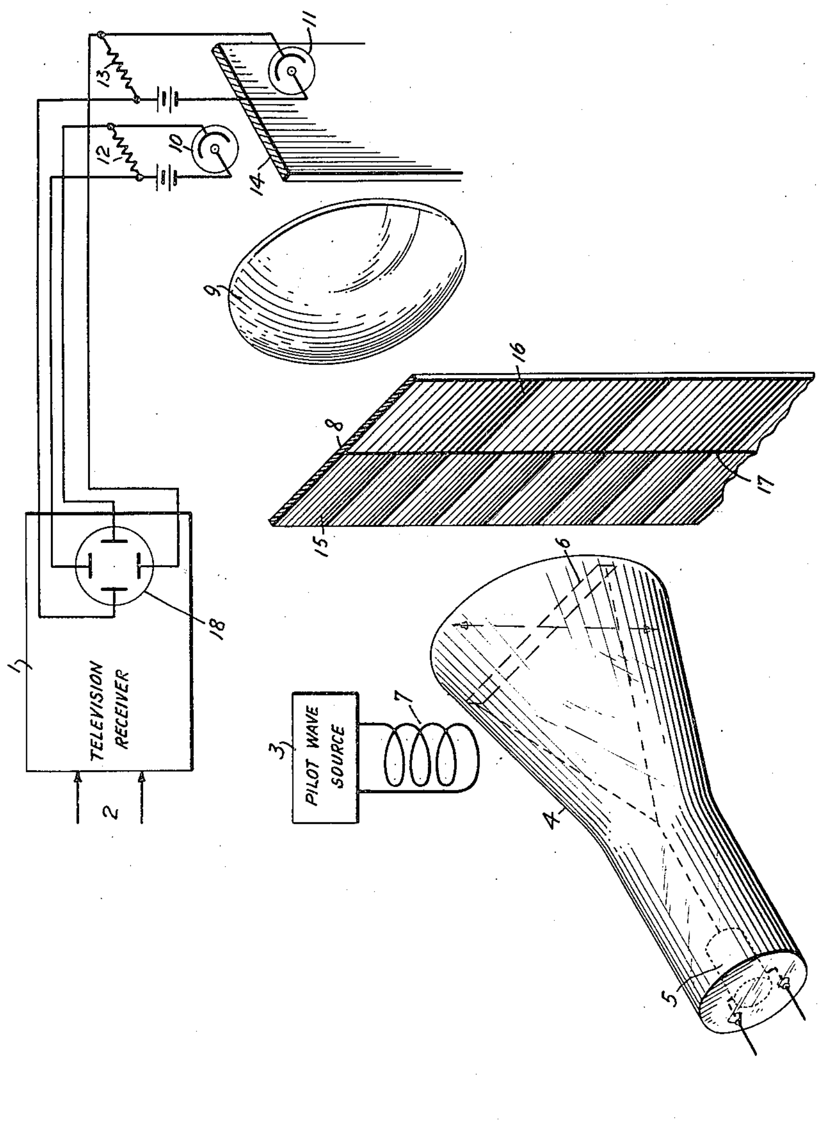
INVENTOR
GEORGES VALENSI
BY R.P. Morris
ATTORNEY Patented Jan. 31, 1950

2,495,790

UNITED STATES PATENT OFFICE 2,495,790

SCANNING SYSTEM FOR TELEVISION RECEIVERS

Georges Valensi, Paris, France

Application March 1, 1941, Serial No. 381,226
In France December 19, 1940

Section 3, Public Law 690, August 8, 1946
Patent expires December 19, 1960

2 Claims. (Cl. 178—7.5)

The invention relates to a system of television. One object of the invention is to provide a receiving television station which, without any important modification, is able to receive pictures transmitted by emitting television stations of very different characteristics.

Instead of relaxation oscillators or similar electrical generators for scanning one line of the image after the other (vertical sweep and horizontal sweep), the receiving station according to the invention embodies a device, which, by simply changing a screen having a transparency varying from one point to the other in accordance with a predetermined law, generates electric currents having the wave-forms necessary for fulfilling the scanning exactly in accordance with the characteristics of the television station sending the images that one wishes to receive.

Another advantage of the invention is to permit to secure between two private television stations (one sending and one receiving) a privacy feature of the television transmission, by using two identical series of screens having predetermined laws of transparency in said two stations, the substitution of one screen to another in each series being made manually or automatically following a predetermined order which constitutes a private code.

The invention will now be described with the aid of the accompanying drawing in which the figure represents schematically one embodiment of the invention;

On this drawing, 1 represents a television receiving station which includes the usual frame and line sweep circuits and differs from those of usual construction only by the elements controlling the scanning of the image. Terminals 2 are the input terminals to which the image signals proceeding from the corresponding emitting station are applied. At terminal 3 is applied a pilot wave (for example a pilot sine wave) proceeding from said distant emitting station. This pilot wave controls the device which generates the electric currents desired for the scanning. This device comprises a cathode ray tube 4 having an electrode gun 5 emitting electrons and a fluorescent screen 6 on which the electronic image (or electrical image) of the gun 5 is obtained.

The coil 7, fed by the hereabove mentioned pilot wave, produces a magnetic field which moves said electrical image of the gun 5 on the fluorescent screen 6. Use is made preferably of a rectilinear cathode giving a rectilinear electrical image transverse to the scanning direction when it is desired to generate more than one waveform for the scanning.

The screen 8, located in front of the fluorescent layer 6, has a transparency which varies from one point to the other in accordance with a predetermined law as indicated by the shading. When a gun 5 providing a rectilinear beam is used, said screen 8 comprises two or more variably transparent parts 15 and 16, separated from each other by straight opaque lines or areas 17 perpendicular to the electron gun beam.

The optical system 9 concentrates the light produced by the fluorescence of screen 6 through the two parts of screen 8 in the photo-electric cells 10 and 11, separated from each other by an opaque wall 14 and positioned respectively to receive light energy through the two variably transparent parts 15 and 16 of screen 8. Across the output resistances 12 and 13 of these photoelectric cells 10 and 11, electric currents are obtained the instantaneous intensities of which depends on the transparency of the points of screen 8 in front of which is located the electrical image of gun 5 at the considered instant. These voltages are applied to the reproducing tube 18 of receiver 1 to furnish the vertical and horizontal sweep voltages.

In order to obtain a negative photographic proof of each part of screen 8, for example of the part corresponding to the horizontal sweep in the scanning of the received image, use may be made at the corresponding emitting television station of a cathode ray oscillograph of the Dufour type which comprises a photographic plate in a vacuum tube, an electrical image of the cathode being obtained on said plate. The hereabove pilot wave generated at the television emitting station is applied to a coil producing a magnetic field which moves said electrical image on said photographic plate whereas a modulating electrode (submitted to the action of the wave corresponding to the horizontal sweep in said emitting television station) modulates the intensity of said electrical image.

A negative photographic proof of the other parts of screen 8 (for example the part corresponding to the vertical sweep in the scanning) is obtained in a similar manner.

The negative proofs so obtained are juxtaposed and a great number of positive proofs are made on photographic film. These positive proofs constitute the screen 8 permitting for various receiving stations, the reception of the television pictures transmitted by the considered emitting station.

Each receiving station is consequently provided with a group of screens 8 corresponding respectively to the various television emitting stations, the emissions of which it is wished to receive.

If, instead of one screen 8 for each television transmission, use is made of a series of screens constituting a cinematographic film moved according to a predetermined law, it is possible to secure the privacy of the pictures transmitted between two private television stations; in such a case said stations will have scanning control elements in accordance with the invention, and the synchronism of the motions of the two cinematographic films (series of screens 8) in the two stations is controlled by the pilot wave feeding the deflection coils 7.

Instead of using a pilot wave applied to terminals 3, use may be made of the fundamental wave of the current produced by electrical mains (networks of electricity distribution) if the networks feeding the receiving television station and the emitting television station are interconnected.

As a pilot wave, use may be made also of a standard synchronising frequency such as those generated in a national laboratory by means of an accurate tuning fork or similar device (frequency standard) if said standard frequency is distributed in both cities where the television corresponding stations are located respectively.

While the present invention as to its objects and advantages has been described herein as carried out in specific embodiments thereof it is not desired to be limited thereby, but it is intended to cover the convention broadly within the spirit and scope of the appended claims.

What is claimed is:

1. A scanning wave generator for television stations adapted to receive picture signals transmitted by various transmitting stations of different scanning laws, comprising a cathode ray tube provided with a fluorescent screen and an electron gun producing a beam of rectilinear cross-section, a scanning control screen mounted in front of said fluorescent screen and provided with a transparent part extending transversely of the rectilinear line of said beam and having a transparency which varies from one point to another in accordance with a predetermined scanning law corresponding to the scanning law at the transmitter from which picture signals are being received, an optical device for focusing fluorescent light passing through the transparent portion of said control screen, a photoelectric cell mounted within the focused area of said optical device and in the region of said variably transparent part, an output circuit for said cell for collecting the scanning line current generated by said cell, a deflecting device for said cathode ray tube mounted to produce deflection of said beam in a direction at right angles to said rectilinear dimension, means for supplying a pilot wave derived from signals received from said transmitting station to said deflecting means whereby said beam is deflected over the said control screen producing a scanning wave corresponding to the said predetermined scanning law and an output circuit for said photoelectric cell, and means for applying the output of said photo cell to the television receiver deflection circuit.

2. A scanning wave generator according to claim 1 wherein said control screen is provided with a second variably transparent part having a transparency which varies from point to point in accordance with a second predetermined scanning law of said transmitter further comprising a second photoelectric cell within the focus area of said optical device and in the region of said second transparent part, and an output circuit for said second cell for collecting the scanning current in accordance with said second transparency part whereby a second scanning wave is simultaneously produced in accordance with said second predetermined scanning law.

GEORGES VALENSI.

REFERENCES CITED

The following references are of record in the file of this patent:

UNITED STATES PATENTS

| Number | Name | Date |
|---|---|---|
| 2,043,800 | Karolus | June 9, 1936 |
| 2,143,093 | Smith | Jan. 10, 1939 |
| 2,144,337 | Koch | Jan. 17, 1939 |
| 2,164,176 | Goldsmith | June 27, 1939 |
| 2,168,047 | Skellett | Aug. 1, 1939 |
| 2,168,049 | Skellett | Aug. 1, 1939 |
| 2,214,077 | Farnsworth | Sept. 10, 1940 |
| 2,241,027 | Burnstead | May 6, 1941 |
| 2,243,600 | Hulst | May 27, 1941 |
| 2,251,525 | Rosenthal | Aug. 5, 1941 |
| 2,261,848 | Goldmark | Nov. 4, 1941 |

FOREIGN PATENTS

| Number | Country | Date |
|---|---|---|
| 819,883 | France | Oct. 28, 1937 |
| 524,443 | Great Britain | July 8, 1940 |